United States Patent Office 2,809,489
Patented Oct. 15, 1957

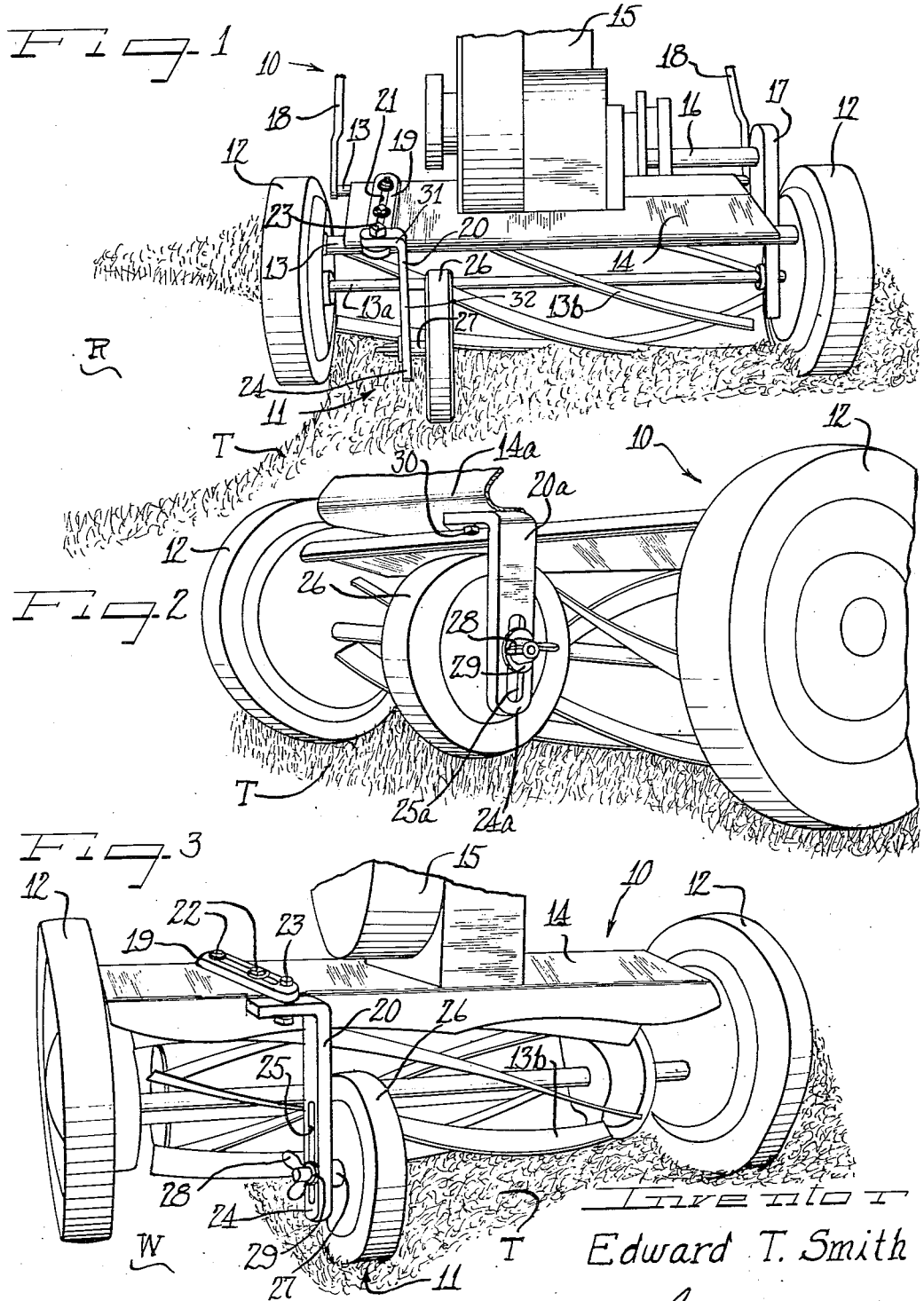

2,809,489

AUXILIARY WHEEL FOR LAWNMOWERS

Edward T. Smith, Crystal Lake, Ill.

Application October 7, 1954, Serial No. 460,940

5 Claims. (Cl. 56—249)

The present invention relates to an auxiliary wheel adapted for attachment to lawn mowers, particularly heavy power lawn mowers, which effectively prevents the mower from tilting when one of the wheels of the mower extends beyond the edge of the lawn being cut, and also prevents the cutting or slicing of the lawn turf when uneven surfaces are being moved.

One of the primary disadvantages in the use of a power lawn mower lies in the problems encountered in mowing lawns in which a recessed walk or flower bed lies adjacent to an edge of the lawn. In order to cut the grass around a recessed walk, flower bed or the like, it is necessary that one of the drive wheels of the mower extend over an edge of the lawn and ride in the recess. With manually operated lawn mowers this does not pose a difficult problem, for most manually operated mowers are light enough so that the side wheel riding over the recess can be maintained in an elevated position during the comparatively short mowing operation merely by exerting counter torsion on the mower handle. In lawn mowers having heavy internal combustion engines mounted thereon, however, elevation of the wheel in the recess by counter torsion on the handle is not possible for the average person. Accordingly, the drive wheel drops into the recess causing the cutter reel to engage the edge of the turf and literally chew it into shreads.

A similar problem exists with heavy power mowers in regards to mowing uneven surfaces, such as terraces or the like. In such cases, it is not uncommon to encounter a ridge or bump which is straddled by the drive wheels of the mower. In such cases the ridge or bump presents an elevated obstruction to the cutter reel resulting in a tearing or scalping of the turf rather than in an even trimming of the grass as desired.

Accordingly, when lawns are mowed with the conventional type of heavy power lawn mower is usually necessary to trim around recessed walks, flower beds or the like with clippers or similar shears after the initial cutting of the lawn. Also, if a highly satisfactory job of mowing is desired, it is not uncommon that terraces or uneven turf will be left to be mowed with a light-weight manual mower rather than risk tearing, scalping or slicing of the turf with a heavy power mower.

According to the general features of the instant invention there is provided an auxiliary or "third wheel" for lawn mowers that is simple in structure, effective in operation, and which may be removably mounted upon a power mower and easily adjusted from its operative to an inactive position without the use of tools, locking pins or the like.

In accordance with the foregoing, an object of this invention is to provide an auxiliary or "third wheel" which is removably mountable between the side whels or drive wheels of a conventional power lawn mower and which prevents the mower from tilting when one of the drive wheels extends beyond the edge of the lawn being cut, and which also materially aids in preventing or minimizing cutting or scalping of the turf when an uneven, offset or angular surface is being mowed.

A distinctive feature of the invention lies in the provision of an auxiliary wheel for power lawn mowers wherein the auxiliary wheel, after its initial mounting on the mower, may be vertically adjusted without the use of tools, locking pins, or the like, in such a manner that the auxiliary wheel may be retained either in operating contact with the surface upon which the mower is operating, or may be retained in a raised or elevated, non-operating or storage position above such surface at substantially any desired height within the limits of the structure.

Other objects features and advantages of the present invention will be readily apparent from the following detailed description of a preferred embodiment thereof taken in conjunction with the accompanying sheet of drawings, in which:

Figure 1 is a partial front elevational view, in perspective, of a conventional power lawn mower having one embodiment of the instant invention mounted thereon;

Figure 2 shows another embodiment, also in perspective, of the instant invention, but slight enlarged from Figure 1; and Figure 3 is a view similar to Figure 2, but showing a slight further modification, also slightly enlarged from Figure 1.

In accordance with the present invention a conventional, power mower, shown generally at 10, (Fig. 1) is provided with a novel and improved auxiliary wheel assembly, shown generally at 11.

The power mower 10 includes parallel, spaced, coaxially aligned side wheels or drive wheels 12, connected by tie rods 13 and an axle 13a. A conventional, helically shaped cutter reel 13b is mounted between the drive wheels 12 and is adapted for rotatable comoverment therewith.

A generally rectangular deck plate 14 is mounted between the drive wheels 12 on the tie rods 13. The deck plate 14 provides a suitable supporting structure for mounting an internal combustion engine 15 on the mower 10. Driving power is delivered from the engine 15 and imparted to the drive wheels 12 by means of a drive shaft 16 and a suitable chain or belt drive 17 connecting the shaft 16 and the axle 13a. The power mower 10, of course, is provided with the usual handles 18 and engine speed controls (not shown).

In the embodiments shown in Figures 1 and 3 the auxiliary wheel assembly 11 is carried by a pair of brackets 19 and 20. The first bracket 19 is removably mounted on the deck plate 14 and projects forwardly therefrom to clear the forward mechanism of the lawn mower 10. The second is an L-shaped bracket 20 which has an upper short arm or leg 31 removably mounted upon the forward projecting end portion of the first bracket 19 and a long arm or leg 32 depending therefrom.

The first bracket 19 preferably comprises an elongated metal bar having a closed slot 21 formed longitudinally therein and opening vertically therethrough. The first bracket 19 is removably mounted upon the deck plate 14 by suitable means, such as a bolt 22 secured through suitable apertures in the deck plate 14. The bracket 19 should preferably be mounted or affixed to the deck plate 14 at least at two points so as to prevent twisting or pivoting of the bracket 19 during use of the mower. Of course, any other means which produces an equivalent result may be utilized to mount or affix the bracket 19 to the deck plate 14. It will, of course, be appreciated that the exact means employed in mounting the first bracket 19 on the deck plate 14 is not critical so long as the bracket 19 is held securely to the deck plate 14 and pivoting or twisting of the bracket is prevented.

Removable mounting of bracket 19 is preferred for it allows greater flexibility in the auxiliary wheel structure and also permits adjustment of the spacing between the auxiliary wheel assembly 11 and the front of the mower 10 by linear adjustment of the first bracket 19.

The depending second bracket 20 is removably attached to the forwardly projecting end portion of the first bracket 19 by a suitable means, such as a bolt 23 coacting through suitable apertures in the first bracket 19 and the short upper leg of the second bracket 20. The depending, free end of the long leg portion of the second bracket 20, such as at 24, is in spaced relation to the turf or surface T upon which the drive wheels 12 operate.

The depending leg of the L-shaped second bracket 20 is provided with an elongated, closed vertically extending slot 25 (Fig. 3) formed longitudinally therein and opening therethrough.

The auxiliary or "third wheel" assembly 11 includes a conventional wheel 26 having an axle 27 projecting unilaterally therefrom. The axle 27 is of a length sufficient to provide a small diameter distal portion to extend freely through the slot 25 of the bracket 20 and project laterally therebeyond, while the larger diameter portion provides a spacer between the wheel 26 and the long leg of the bracket 20 and a shoulder bearing against the long leg at one side of the slot 25. A washer 29 forms a bearing shoulder for a wing nut 28 on the other side of the slot 25. The reduced diameter distal end portion of the axle 27 is threaded to receive manually releasable means, such as said wing nut 28, for locking the axle 27 in the slot 25 at any desired position along the length of the slot 25, to thereby determine the elevation of the wheel 26.

The wheel 26, preferably has a diameter smaller than the diameter of the drive wheels 12. The wheel 26 may be affixed or mounted upon the axle 27 in any suitable fashion and may or may not include ball or roller bearing elements as desired.

By merely tightening or loosening the wing nut 28, as the case may be, the wheel 26 can be easily vertically adjusted in the slot 25. The wheel 26 may be effectively retained in operating contact with the turf T by lowering the wheel 26 to the proper position and tightening the wing nut 28 to lock the wheel 26 against vertical movement. When it is desired that the wheel 26 be retained in a non-operating or storage position above the turf T one merely loosens the wing nut 28, raises the wheel 26 to any desired position along the length of the slot 25 and locks it in such a position by tightening the wing nut 28. In this fashion it is possible to retain the auxiliary wheel assembly 11 at any desired height above the turf T within the limits of the length of the slot 25.

In the embodiment shown in Figure 2, the means provided for removably mounting the L-shaped depending auxiliary wheel bracket does not contemplate the use of a first bracket such as shown in Figures 1 and 3. Rather, such means merely comprise the deck plate 14. In certain commercially available power mowers, the deck plate 14 projects forwardly of the lawn mowever between the drive wheels 12 such as at 14a. In the embodiment shown in Figure 2, the forwardly projecting upwardly curved portion 14a of the deck plate 14 is utilized as means for mounting the dependent auxiliary wheel bracket. As seen therein, the L-shaped bracket 20a is removably mounted upon the underside of the forwardly projecting portion 14a of the deck plate 14 by suitable means such as a bolt and nut arrangement 30. The bracket 20a, although shown as being mounted on the forwardly projecting portion 14a substantially mid-way between the drive wheels 12, may of course, be suitably located at any desired lateral operative position on the projection 14a.

The L-shaped auxiliary wheel support bracket 20a is identical with that shown in Figures 1 and 3 and is mounted so as to depend from the projection 14a. The free depending end portion of the bracket 20a in Figure 2, as at 24a is in spaced relation to the surface T upon which the drive wheels 12 operate. The auxiliary wheel assembly 11 comprising the wheel 26 and the axle 27 projecting unilaterally therefrom is mounted in a slot 25a on the bracket 20a by means of a wing nut 28 in the same manner as described under Figures 1 and 3 and is vertically adjusted in the same manner.

The high degree of flexibility of the instant auxiliary wheel is shown best in Figure 3. As seen therein, the bracket 19 may be mounted in angled relation to the longitudinal axis of the deck plate 14 at any desired position. The short arm of the L-shaped auxiliary wheel supporting bracket 20, which is removably attached to the forwardly projecting end of the bracket 19, allows the bracket 20 and the auxiliary wheel 26 to be pivotally adjusted to any desired angle. In this manner, regardless of the angular disposition of the bracket 19 to the deck plate 14, the wheel 26 may be maintained in operating right angled relationship to the longitudinal axis of the cutter reel 13b.

It will be apparent, then, that the disposition of the auxiliary wheel assembly 11 and its supporting brackets 19 and 20 are relatively adjustable to each other in at least four ways; namely: (1) the bracket 19 is adjustable lineally and may be moved fore and aft of the mower 10 so as to regulate the distance between the front of the mower 10 and the depending bracket 20; (2) the bracket 19, as seen in Figure 3, may be disposed in angled relationship to the horizontal axis of the deck plate 14; (3) the depending wheel supporting bracket 20 is pivotally adjustable to maintain the wheel 26 is right angled relationship to the longitudinal axis of the cutter reel 13b; and, (4) the wheel 26 is adapted for vertical adjustment in the slot 25.

The manner in which the auxiliary wheel assembly 11 functions to prevent the mower 10 from tilting when cutting around the edge of a recessed portion of a lawn is seen best in Figures 1 and 3. In Figure 1 the power mower 10 and wheel assembly 11 are illustrated as being used in mowing the edge of a lawn T adjacent a recessed portion R, such as a flower bed or the like. As shown therein, the drive wheel 12 on the left hand side of the drawing adjacent the auxiliary wheel assembly 11 rides over the recessed portion R. If the auxiliary wheel assembly were not present, the drive wheel 12 would drop into the recess R causing the cutter reel 13b to seriously cut and tear the turf T at the edge of the recess R. The presence of the auxiliary wheel assembly 11, however, prevents this damage from occurring, for the weight of the mower 10, which normally is carried by the drive wheel 12 in the recess R is now borne by the wheel 26 and the mower is maintained in a level position. This allows the blades of the cutter reel 13b to cut the grass to the proper height without scalping the perimeter defining the depression R.

In Figure 3 the auxiliary wheel assembly 11 is shown as applied to trimming the edge of a lawn or turf T adjacent a sidewalk, shown generally at W. The instant invention is applicable to trimming the edge of a lawn adjacent a sidewalk which is either of a higher or lower level than the grass to be cut. When the side-walk W is lower than the turf T the mower 10 would, of course, be operated in the same manner as shown in Figure 1. When the walk W is higher than the grass, the mower 10 is driven on the walk W supported by the auxiliary wheel assembly 11 and one drive wheel 12, while the opposite drive wheel 12 is allowed to project over the edge of the walk to trim the grass to the same level as the height of the walk W.

Another distinctive feature of the instant invention lies in the mowing of terraces and other uneven ground with a power mower. In mowing terraces or similar ridges in lawns the auxiliary wheel assembly 11 tends to elevate the drive wheel 12 on that side of the mower upon which the auxiliary wheel assembly 11 is mounted. This action raises the center of the cutter reel 13b allowing the cutter reel to pass more easily over a ridge or bump in the turf and thereby prevents or materially minimizes tearing or digging into the turf T by the blades of the cutter reel 13b.

Another distinct advantage in the auxiliary wheel assembly 11 of the instant invention lies in the ease with which the wheel 26 may be vertically adjusted between an at-rest or storage position and a lowered position wherein the wheel 26 is in operating contact with the turf T. By employing a manually releasable locking means, such as the wing nut 28, for rigidly retaining the wheel 26 and axle 27 in a desired position, all needs for extraneous tools, locking pins, or the like in vertically adjusting and retaining the auxiliary wheel are completely eliminated. Therefore, there is no need to carry extra tools or loose parts about as the mower is being operated.

In addition, the auxiliary wheel assembly 11 in the instant invention may be vertically adjusted to any height desired; the position of the wheel merely being restricted by the surface upon which it rests and the upper limits of the slot 25.

Although the instant invention has been described with particular detail in its application to heavy power lawn mowers, it will be appreciated by those skilled in the art that the instant auxiliary wheel assembly can also be attached to manually operated lawn mowers where the operation of such lawn mowers involves problems similar to those encountered in the operation of power lawn mowers.

It will be understood that modifications and variations may be effected without departing from the scope of the novel concepts of the present invention.

I claim as my invention:

1. In combination with a lawn mower including parallel spaced side wheels having a deck plate disposed therebetween, the improvement comprising, an auxiliary-wheel bracket having a vertically directed slot therein extending laterally through said bracket; means removably pivoting said bracket to the deck plate about a vertical axis; said bracket depending from said means forward of the lawn mower; said bracket having a depending free end terminating in upwardly spaced relation to a surface upon which the side wheels operate; an auxiliary wheel; an axle carrying said wheel for rotation, said axle projecting unilaterally and coaxially from said wheel, and being adjustably mounted in said slot; and means locking said axle in said slot in a selected position.

2. In an auxiliary wheel assembly for attachment to a lawn mower having parallel side wheels and a deck plate mounted therebetween, a support bracket removably secured on said deck plate and projecting laterally forwardly therefrom, said support bracket being lineally adjustable fore and aft of said mower transversely to the longitudinal axis of said side wheels, a depending removable auxiliary wheel bracket having a vertically directed slot extending therethrough and pivotally supported by the forwardly projecting end portion of said support bracket about a vertical axis, an auxiliary wheel having an axle projecting unilaterally therefrom, said axle being received by said slot and being vertically adjustably retained therein, and means locking said axle in said slot in a selected position along the length thereof.

3. In an auxiliary wheel assembly for attachment to a lawn mower having parallel side wheels and a deck plate mounted therebetween, the improvement comprising means for pivotally supporting an auxiliary wheel bracket about a vertical axis, said means being secured to the deck plate, a depending removable auxiliary wheel bracket having a vertically extending slot therethrough attached to said means and pivotable about said vertical axis to a selected position, an auxiliary wheel having an axle projecting unilaterally therefrom, said axle being received by said slot for vertically adjustable retention therein, and means locking said axle in said slot in a selected position along the length thereof.

4. In an auxiliary wheel assembly for attachment to a lawn mower having parallel side wheels and a deck plate mounted therebetween, means for pivotally supporting a depending auxiliary wheel bracket from said deck plate, a depending L-shaped auxiliary wheel bracket removably attached to said means, said auxiliary wheel bracket including a short leg removably carried by said means for pivotal movement relative thereto and a depending longer leg having a vertically extending slot therethrough, an auxiliary wheel having a stepped axle projecting unilaterally therefrom, said stepped axle including a proximal portion adjacent said auxiliary wheel having a diameter greater than the width of said slot and providing an abutment shoulder for said wheel on one side of said depending leg, and a distal portion having a diameter smaller than the width of said slot and received by said slot and extending laterally therethrough beyond the other side of said depending leg, and locking means engaging said laterally projecting distal portion of said axle on said opposite side of said depending leg and coacting with said proximal portion of said axle on said one side of said depending leg whereby said axle may be locked in said slot at any position along the length thereof.

5. In an auxiliary wheel assembly for attachment to a lawn mower having parallel side wheels and a deck plate mounted therebetween, a depending L-shaped auxiliary wheel bracket, said bracket being removably attached to said forwardly projecting deck plate, said auxiliary wheel bracket including a short leg removably carried by said deck plate and a depending longer leg having a vertically extending slot formed therethrough, an auxiliary wheel having a stepped axle projecting unilaterally therefrom, said stepped axle including a proximal portion adjacent said auxiliary wheel having a diameter greater than the width of said slot and providing an abutment shoulder for said wheel on one side of said depending leg, and a distal portion having a diameter smaller than the width of said slot and received by said slot, said distal portion extending laterally therethrough beyond the other side of said depending leg, and locking means engaging with said laterally projecting distal portion of said axle on said opposite side of said depending leg and coacting with said proximal portion of said axle on said one side of said depending leg whereby said axle is locked in said slot in a selected position along the length thereof.

References Cited in the file of this patent

UNITED STATES PATENTS

| | | |
|---|---|---|
| 2,485,312 | Powell | Oct. 18, 1949 |
| 2,546,279 | Stahl | Mar. 27, 1951 |
| 2,644,290 | Andrew | July 7, 1953 |
| 2,737,771 | Holtz | Mar. 13, 1956 |